(12) United States Patent
Volbers

(10) Patent No.: US 12,012,945 B2
(45) Date of Patent: Jun. 18, 2024

(54) METHOD FOR STORING POTENTIAL ENERGY

(71) Applicant: Eickhoff Antriebstechnik GmbH, Bochum (DE)

(72) Inventor: Thomas Volbers, Soest (DE)

(73) Assignee: Eickhoff Antriebstechnik GmbH, Bochum (DE)

( * ) Notice: Subject to any disclaimer, the term of this patent is extended or adjusted under 35 U.S.C. 154(b) by 109 days.

(21) Appl. No.: 17/763,447

(22) PCT Filed: Sep. 25, 2020

(86) PCT No.: PCT/EP2020/076969
§ 371 (c)(1),
(2) Date: Mar. 30, 2022

(87) PCT Pub. No.: WO2021/058778
PCT Pub. Date: Apr. 1, 2021

(65) Prior Publication Data
US 2022/0290658 A1    Sep. 15, 2022

(30) Foreign Application Priority Data
Sep. 25, 2019   (DE) .................... 10 2019 125 840.5

(51) Int. Cl.
*F03G 3/00*   (2006.01)
*H02J 3/32*   (2006.01)
(52) U.S. Cl.
CPC ............... *F03G 3/094* (2021.08); *H02J 3/32* (2013.01)
(58) Field of Classification Search
CPC ..................................................... F03G 3/094
(Continued)

(56) References Cited

U.S. PATENT DOCUMENTS

| 2011/0241354 A1 | 10/2011 | Khoshnevis et al. |
| 2016/0084236 A1* | 3/2016 | Kellinger ................ F03G 3/087 60/495 |

FOREIGN PATENT DOCUMENTS

| FR | 2985789 A1 | 7/2013 |
| GB | 249007 A | 8/2013 |

(Continued)

OTHER PUBLICATIONS

International Preliminary Report on Patentability for PCT Application No. PCT/EP2020/076969 dated Feb. 7, 2022, with its English translation, 26 pages.

(Continued)

*Primary Examiner* — Joseph Chang
(74) *Attorney, Agent, or Firm* — Peter W. Schroen; Bret E. Field; Bozicevic, Field & Francis LLP

(57) ABSTRACT

The invention relates to a storage unit (2) for storing energy in the form of potential energy, comprising at least one potential energy storage device (4) for receiving, storing and releasing energy, at least one guide element (6) for guiding the potential energy storage device (4) along a guide path (8), wherein the guide path (8) is arranged within a shaft (10) arranged in the ground vertically with respect to the ground surface, wherein the potential energy storage device (4) obtains the stored potential energy by conversion from kinetic energy and releases it by conversion into kinetic energy, wherein the kinetic energy results from a movement of the potential energy storage device (4) along the guide path (8), and wherein the potential energy storage device (4) is formed in the form of a continuous weight extending beyond the length of the guide path (8).

19 Claims, 3 Drawing Sheets

Figure 2:
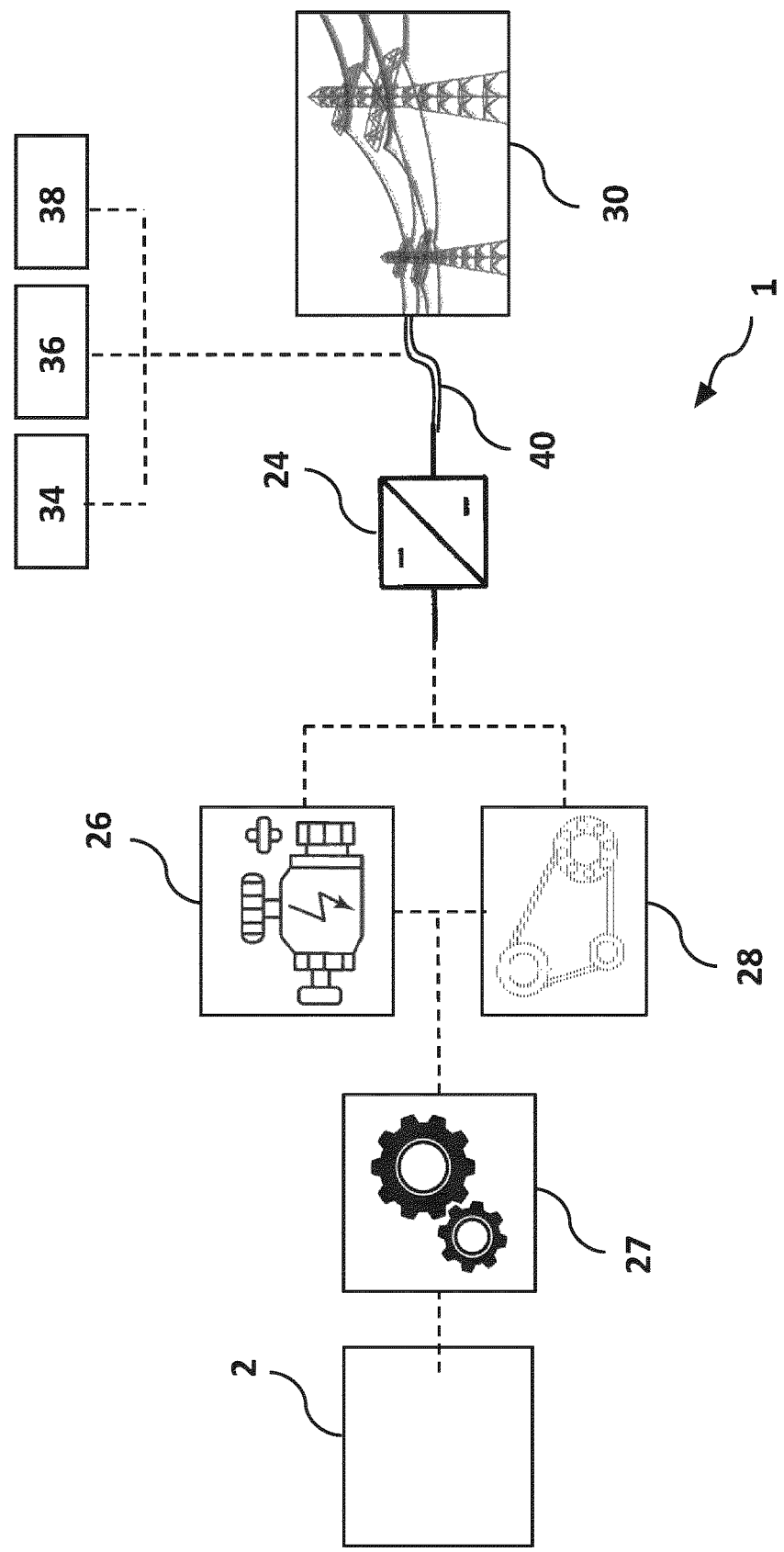

(58) Field of Classification Search
USPC .......................................................... 307/23
See application file for complete search history.

(56) References Cited

FOREIGN PATENT DOCUMENTS

RU         2263818 C1    11/2005
SU         1300189 A1    3/1987

OTHER PUBLICATIONS

First Written Opinion for PCT Application No. PCT/EP2020/076969 dated Aug. 4, 2021, 7 pages.
Second Written Opinion for PCT Application No. PCT/EP2020/076969 dated Dec. 16, 2021, 7 pages.
Office Action for Russian Application No. 2022109592/12(020085) dated Feb. 7, 2024, with its English Translation, 16 pages.

* cited by examiner

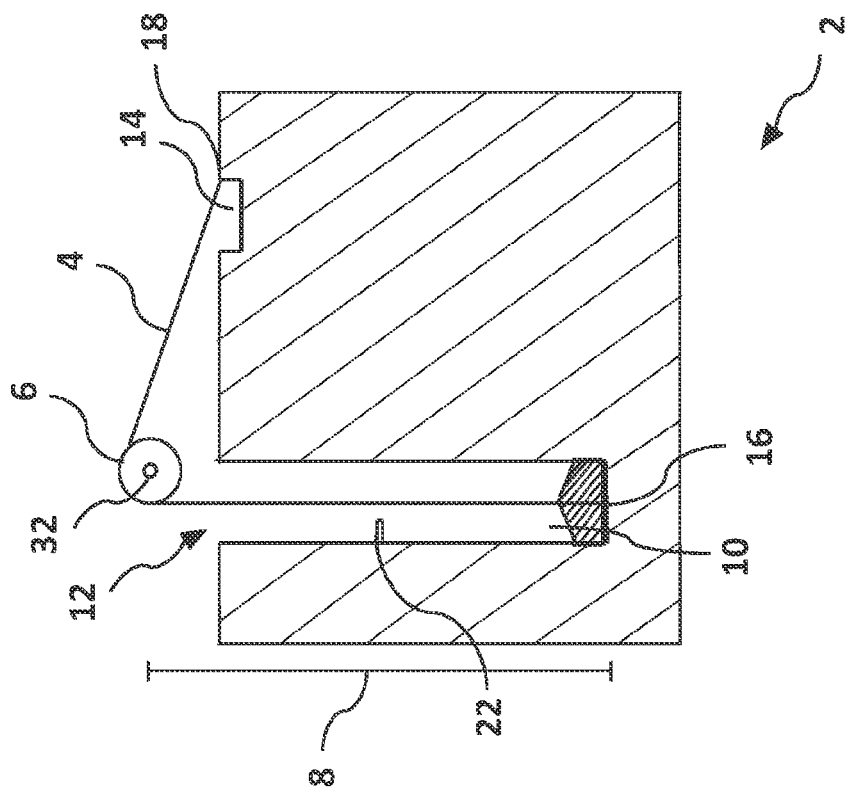
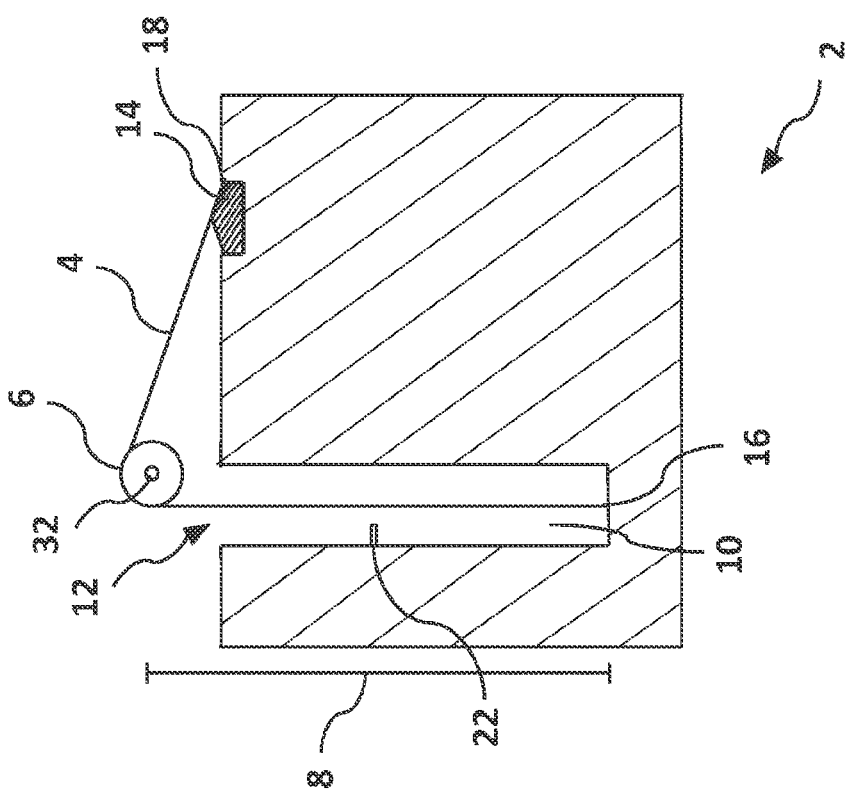
Fig. 1a
Fig. 1b

METHOD FOR STORING POTENTIAL ENERGY

The present invention relates to a storage unit for storing energy in the form of potential energy, and to a system and method for compensating for network fluctuations of a power supply network.

Among other things, due to the increasing provision of energy from renewable energy sources and the associated irregular feed-in of energy, today's power supply networks are sometimes subject to strong network fluctuations.

To remedy such network fluctuations and ensure that the network voltage remains as constant as possible, storage capacities that can be activated quickly are primarily used to feed energy into the power supply network that is needed at short notice. In this context, potential energy sources such as lifting storage power plants have proven to be particularly effective. Such storage systems are capable of absorbing or releasing large amounts of energy at short notice and thus balancing out network fluctuations. The energy supplied to the storage systems is stored in the form of potential energy. In particular, prior art lift storage systems use the conversion of potential energy into vertical kinetic energy in order to convert the kinetic energy into electrical energy via suitable devices such as gearboxes and generators or similar.

The known lift storage systems use discrete weights that are raised or lowered within shafts or the like and thereby generate electrical power. However, the use of discrete weights has the disadvantage that the weights used must be replaced after being lowered to the bottom, for example the bottom of a shaft, in order to be able to guarantee the generation of further energy. This process requires time during which no energy can be generated. This results in undesirable downtime during which no compensation for network fluctuations can be achieved. Although systems are known in which weights can be suspended and removed from a transport system by means of a transport mechanism, these systems are disadvantageously very bulky and cost-intensive.

It is therefore an object of the present invention to at least partially overcome the above-mentioned disadvantages of known systems for storing energy in the form of potential energy. In particular, it is an object of the invention to provide a device for storing energy in the form of potential energy, which enables continuous and uninterrupted generation or storage of potential energy in a simple and cost-effective manner over a longer period of time.

The foregoing object is solved by a storage unit having the features of the independent device claim, a system having the features of the independent system claim, and a method having the features of the independent method claim. Further features and details of the invention result from the respective dependent claims, the description and the drawings. Features and details which are described in connection with the storage unit according to the invention naturally also apply in connection with the system according to the invention as well as the method according to the invention and vice versa in each case, so that with regard to the disclosure concerning the individual aspects of the invention reference is or can always be made mutually.

According to the invention, a storage unit for storing energy in the form of potential energy is provided, which comprises at least one potential energy storage device for receiving, storing and delivering energy and at least one guide element for guiding the potential energy storage device along a guide path, wherein the guide path is arranged within a shaft arranged in the ground vertically to the earth's surface, wherein the potential energy storage device obtains the stored potential energy from kinetic energy by conversion and delivers it by conversion into kinetic energy, and wherein the kinetic energy results from a movement of the potential energy storage device along the guide path. In this regard, the present storage unit is characterized in that the potential energy storage device is formed in the form of a continuous weight extending along the length of the guide path.

The storage unit according to the present invention can be used in particular for balancing network fluctuations of power supply network, whereby for this purpose preferably several storage units according to the present invention can be interconnected or optionally switched on and off. The guide path according to the invention can be arranged at least partially within a shaft arranged in the ground, whereby the shaft itself does not necessarily have to be arranged completely within the ground. In the context of the invention, a shaft is understood to mean, in particular, a cavity arranged substantially vertically to the surface of the ground, preferably constructed by humans. Thus, shafts can be understood as, for example, mine shafts, oil well shafts, experimental shafts or shafts for the development of other types of deposits or the like. The use of mine shafts in this context is particularly appropriate in view of the closure of a large number of such shafts in the context of the "mass closures of collieries.

According to the invention, a continuous weight is preferably understood to be a weight composed of a plurality of interconnected units which, despite a sinking or lowering of a first number of units to the ground—for example the bottom of a shaft—can continue to release potential energy via the sinking or lowering of further units of the continuous weight. The length of a guide path can preferably extend at least over the total length or depth of the shaft in question.

Within the scope of the invention, it has been recognized that via a storage unit for storing energy in the form of potential energy with a potential energy storage device in the form of a continuous weight, a continuous and uninterrupted supply and withdrawal of energy to and from a power supply network is possible in a constructively simple and cost-effective manner.

Within the scope of a constructively simple and precisely controllable possibility of converting potential energy into kinetic energy, it can be advantageously provided in accordance with the invention that the potential energy storage device is formed in the form of a rope and/or a chain. Within the scope of a design of the energy storage device in the form of a rope or a chain, it can be advantageously provided in this case that the potential energy storage device is already arranged in an initial state over the entire depth or the entire guide path in the shaft. In particular, this allows maximum torque to be called up already at the beginning of the movement of the guide element along the guide path and maximum power to be called up at constant power.

Within the scope of the possibility of a particularly effective energy conversion as well as a design that is as simple and inexpensive as possible, it can also be provided that the potential energy storage device is formed in the form of a chain, whereby the chain is preferably formed from a link chain and/or a roller chain and/or a toothed chain. However, the chain can also be in the form of a bar chain, plate chain, pin chain, roller chain, toothed chain or the like.

In order to ensure complication-free guidance and to prevent possible entanglement of chain links, the invention may further provide that the energy storage device is formed in the form of a chain, the chain preferably being formed without latching.

With regard to a low-cost, stable material with the necessary density and weight, it can also be provided that the potential energy storage device is made of a metal material, preferably a ferrous material, in particular steel. Within the scope of a weather-resistant design, the potential energy storage device can preferably be made of stainless steel. Alternatively, the energy storage device can also have a coating or a sheathing made of plastic or the like.

In order to ensure the longest possible continuous energy conversion from potential energy to kinetic energy and to be able to accommodate the potential energy storage device safely at the same time, it is also conceivable within the scope of the invention that a stock is provided for storing the energy storage device, the stock preferably being arranged directly next to an insertion opening of the shaft. In this case, the stock is preferably designed in such a way that at least part of the energy storage device can be arranged within the stock.

In the context of a well-protected arrangement of the energy storage device, the stock can be designed, for example, in the form of a trench embedded in the ground, whereby the trench can preferably be lined with a weather-resistant material. In particular, the stock can be designed like a bunker or the like.

With regard to a structurally simple possibility of guiding an energy storage device along a guide path as well as with regard to an effective drive, it can be further provided that the guide element is designed in the form of a chain wheel and/or a cable drum. Within the scope of the design of the energy storage device in the form of a link chain, the guide element can be designed in particular in the form of a pocket wheel.

Within the scope of an effective utilization of the length of the potential energy storage device to ensure a preferably continuous conversion of potential energy into kinetic energy, it can be provided according to the invention in particular that the potential energy storage device has a beginning and an end, the beginning preferably being arranged permanently along the guide path within the shaft and the end being arranged permanently within the stock. The beginning of the energy storage device can be arranged here preferably unattached permanently along the guide path within the shaft, while the end is preferably attached within the stock, so that a sinking of the energy storage device into the shaft is prevented.

In order to ensure the safest and most reliable use of the storage unit even in emergency situations, it can be provided in particular that the potential energy storage device is arranged in an initial state within the shaft in such a way that a movement of the energy storage device along the guide path in one direction into the interior of the shaft takes place after a release without auxiliary power. In this way, the present storage device is capable of emergency power supply and can be used at full power within a few seconds.

In order to ensure such a release, it can be provided in particular that the guide element has a switching element for releasing the energy storage device, wherein the switching element can preferably be switched off manually, in particular in the form of a backstop or pawl. The switching element can preferably be designed and switched in such a way that the potential energy storage device is held in position during an intended standstill and is additionally supported in this.

In the context of ensuring the necessary safety, it can also be advantageous to provide an emergency brake device for braking and stopping the energy storage device in the event of a hazardous situation or a power failure. This can be used in particular if the function of the switching element in question is at least partially restricted. In this case, the emergency brake device can preferably be arranged on or at the guide element or the energy storage device and advantageously be closed in an energy-free state so that it can be actuated without additional energy. Arrangement at other positions, for example within the shaft, is also conceivable. In this case, the emergency brake device can be controlled hydraulically or pneumatically, for example, and can initiate a braking action, for example, by acting on a spring, whereby a braking action can advantageously be generated via a positive locking. The emergency brake device can also be designed as a service brake or as a holding brake, with the emergency brake device being arranged in the load direction or in the power flow upstream of a transmission for energy or power transmission, in particular in a design as a holding brake.

In the context of a flexible feed-in and feed-out also of larger energy quantities, it can be provided according to the invention in particular that a plurality of potential energy storage devices is provided, the energy storage devices preferably being arranged next to each other on the same shaft, in particular on separate guide element.

In the case of an arrangement of a plurality of energy storage devices, it is then equally useful that a plurality of stocks are also provided for storing the energy storage devices, wherein the stocks can preferably be arranged next to one another and/or opposite one another along the insertion opening of the shaft.

Likewise, it can be advantageous if, in the case of an arrangement of several energy storage devices, a plurality of switching elements and/or emergency brake devices is also provided, advantageously one switching element and/or emergency brake device for each energy storage device, the switching elements and/or emergency brake devices preferably being switchable independently of one another.

With regard to a targeted feed-in and feed-out of energy to and from the storage unit in question, it can be provided in particular that a detection unit is provided for detecting the current storage capacity, the detection unit preferably having sensors which are designed in particular in the form of a rotary encoder. Such a rotary encoder can preferably be designed in the form of a multiturn encoder, which advantageously detects the rotary movement of the guide element and, on the basis of the number of revolutions with a known initial supply of potential energy storage device within the stock, enables a calculation of the current storage of potential energy storage device located in the stock or of the energy storage device already drained. In this way, information about the current storage capacity of an object storage unit can be determined remotely via data transmission. Furthermore, additional, preferably retrofittable sensors can also be provided for recording further relevant parameters, such as current speeds, torques, currents, voltages, frequencies, vibration speeds, temperatures, switching states of clutches, brakes and backstops or the like, whereby relevant parameters can be continuously determined by means of said sensors and the operation of an object storage unit can be optimized on the basis of the determination. It is also conceivable to remotely control an objective facility by means of continuous monitoring and/or to network it with other facilities in order to optimize its operation.

It is also an object of the invention to provide a system for balancing network fluctuations of an power supply network. The system comprises a storage unit as described above, at least one motor for driving the guide element via energy from the power supply network, at least one generator for converting kinetic energy of the potential energy storage device into electrical energy for delivery to the power supply network, and a line system for exchanging electrical energy between the power supply network and the storage unit, the system being designed in such a way that, in times of undersupply of the power supply network, potential energy can be unconverted into electrical energy by means of the storage unit and fed into the power supply network, and, in times of oversupply of the power supply network, electrical energy can be withdrawn from the power supply network and unconverted into potential energy for storage. The system according to the invention thus brings the same advantages as have already been described in detail with respect to the storage unit in question.

With regard to effective conversion of various forms of energy, it is further conceivable in particular that a frequency converter is provided for converting the current into a form suitable for the motor.

In the context of a targeted feed-in and feed-out of energy to ensure the most effective possible balancing of network fluctuations of the power supply network, according to the invention it can further be provided in particular that a detection unit is provided for detecting a current network load.

Likewise, with regard to an effective compensation of network fluctuations of the power supply network, it can be provided that a processing unit is provided for determining an energy that can be taken from the power supply network or that can be discharged into the power supply network on the basis of the detected current network load as well as a control unit for controlling an energy transfer between the storage unit and the power supply network on the basis of the determined energy that can be taken or that can be discharged into the power supply network.

Another object of the invention is a method for balancing network fluctuations of a power supply network, in particular using a system described above for balancing network fluctuations of a power supply network. In this case, the method in question comprises the steps of detecting a current network load of a power supply network by means of a detection unit, determining an energy which can be withdrawn from the power supply network or is to be discharged into the power supply network on the basis of the detected current network load by means of a processing unit, and controlling an energy transfer between the storage unit and the power supply network on the basis of the determined energy which can be withdrawn or is to be discharged into the power supply network by means of a control unit, wherein, in times of undersupply of an power supply network, potential energy is converted into electrical energy by means of the storage unit and fed into the power supply network, and, in times of oversupply of the power supply network, electrical energy is withdrawn from the power supply network and converted into potential energy for storage. Thus, the method according to the invention brings the same advantages as have already been described in detail with respect to the storage unit according to the invention or the system according to the invention for balancing network fluctuations of an power supply network.

Further advantages, features and details of the invention will be apparent from the following description, in which embodiments of the invention are described in detail with reference to the drawings. In this connection, the features mentioned in the claims and in the description may each be essential to the invention individually or in any combination.

Figure 3:
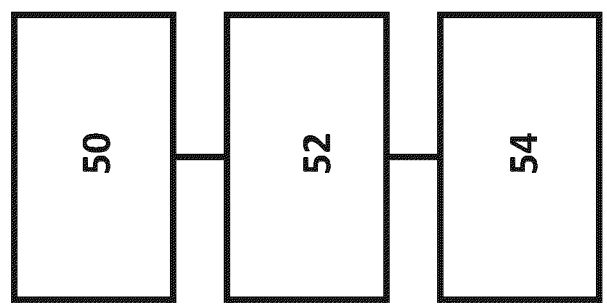

The figures show:

FIG. 1a a schematic representation of a storage unit according to the invention in accordance with a first embodiment in an initial state, FIG. 1b a schematic representation of a storage unit according to the invention in accordance with a first embodiment in a final state, FIG. 2 a schematic representation of a system according to the invention for balancing network fluctuations of a power supply network according to a first embodiment, FIG. 3 a schematic representation of the individual steps of a method according to the invention for compensating network fluctuations of an power supply network.

FIG. 1 shows a schematic representation of a storage unit 2 according to the invention in accordance with a first embodiment example in an initial state. Here, the storage unit 2 for storing energy in the form of potential energy comprises at least one potential energy storage device 4 for receiving, storing and delivering energy, at least one guide element 6 for guiding the potential energy storage device 4 along a guide path 8, wherein the guide path 8 is arranged within a shaft 10 arranged on the ground vertically with respect to the earth surface, wherein the potential energy storage device 4 obtains the stored potential energy by conversion from kinetic energy and releases it by conversion into kinetic energy, wherein the kinetic energy results from a movement of the potential energy storage device 4 along the guide path 8. Here, the potential energy storage device 4 is formed in the form of a continuous weight extending along the length of the guide path 8.

In this case, the potential energy storage device 4 is in the form of a chain. Alternatively, the potential energy storage device 4 can also be formed in the form of a cable or the like. In the case of an embodiment of the potential energy storage device 4 in the form of a chain, this can be formed in particular in the form of a link chain and/or a roller chain and/or a toothed chain or the like. In an embodiment of the energy storage device 4 in the form of a chain, this can in particular be formed without links in order to prevent possible entanglement of the chain links.

The potential energy storage device 4 is preferably made of a metal material, advantageously a ferrous material, in particular steel. For the storage of the energy storage device 4, a stock 14 is also provided, which can be arranged close to, preferably directly next to, an insertion opening 12 of the shaft 10. The stock 14 can in this case be formed in particular in the form of a trench or the like let into the ground, which can preferably be lined with a weatherproof material or the like.

Within the scope of a structurally simple possibility of guiding the energy storage device 4, the guide element 6 can, for example, be in the form of a sprocket wheel and/or a cable drum or the like.

The potential energy storage device 4 has a beginning 16 and an end 18, the beginning 16 being presently permanently disposed along the guide path 8 within the shaft 10 and the end 18 being permanently disposed within the stock 14 and presently secured within the stock 14.

The guide element 6 here has a switching element 20, not shown here, for releasing the energy storage device 4, which can be switched off manually and can be designed in particular in the form of a backstop. Furthermore, the store unit 2 comprises an emergency brake device 22 for braking and stopping the energy storage device 4 in a hazardous situation or a power failure. The emergency brake device 22 in question can likewise be arranged on the guide element 6 or the energy storage device 4 and advantageously be closed in an energy-free state, so that it can be actuated without additional energy.

In addition, the storage unit 2 comprises a detection unit 32 for detecting the current storage capacity, which in the present case is in the form of a rotary encoder. This rotary encoder can determine the number of revolutions of the guide element 6 and, on the basis of the number of revolutions with a known initial supply of potential energy storage 4 within the stock 14, enable a calculation of the current storage of potential energy storage 4 located in the stock 14.

In the initial state shown in FIG. 1*a*, the potential energy storage device 4, formed in the form of a chain, is still almost completely arranged within the stock 14.

FIG. 1*b* shows a schematic representation of a storage unit 2 according to the invention in accordance with a first embodiment in a final state.

According to the final state shown in FIG. 1*b*, the potential energy storage device 4 is now completely located within the shaft 10, in particular at the bottom of the shaft 10, so that no potential energy in the form of position energy is now present in the potential energy storage device 4. In order to "recharge" the energy storage device 4 to its original state, it would have to be conveyed back out of the shaft 10 into the stock 14 via the guide element 6.

FIG. 2 shows a schematic diagram of a system 1 according to the invention for balancing network fluctuations of a power supply network 30 according to a first embodiment.

In this case, the system 1 comprises a storage unit 2 described above, at least one motor 26 for driving the guide element 6 of the storage unit 2 using energy from the power supply network 30, at least one generator 28 for converting kinetic energy of the potential energy storage device 4 into electrical energy for delivery to the power supply network 30, and a line system 40 for exchanging electrical energy between the power supply network 30 and the storage unit 2, the system 1 being designed in this case in such a way that, in times of undersupply of the power supply network 30, potential energy cannot be converted into electrical energy by means of the storage unit 2 and can be fed into the power supply network 30, and, in times of oversupply of the power supply network 30, electrical energy can be withdrawn from the power supply network 30 and cannot be converted into potential energy for storage.

A frequency converter 24 is also provided for converting the current into a form suitable for the motor 26. In addition, the present system 1 comprises a detection unit 34 for detecting a current network load, a processing unit 36 for determining an energy that can be extracted from the power supply network or can be discharged into the power supply network on the basis of the detected current network load, and a control unit 38 for controlling an energy transfer between the storage unit 2 and the power supply network 30 on the basis of the determined energy that can be extracted from or discharged into the power supply network.

FIG. 3 shows a schematic representation of the individual steps of a method according to the invention for compensating network fluctuations of a power supply network 30.

In this case, the method in question comprises the steps of detecting 50 a current network load of an power supply network 30 by means of a detection unit 34, determining 52 an energy which can be extracted from the power supply network 30 or is to be discharged into the power supply network 30 on the basis of the detected current network load by means of a processing unit 36, and controlling 54 an energy transfer between the storage unit 2 and the power supply network 30 on the basis of the determined energy which can be extracted or is to be discharged into the power supply network 30 by means of a control unit 38, wherein in times of an undersupply of an power supply network 30, potential energy is converted into electrical energy by means of the storage unit 2 and fed into the power supply network 30, and in times of an oversupply of the power supply network 30, electrical energy is extracted from the power supply network 30 and converted into potential energy for storage.

By means of the storage unit according to the invention for storing energy in the form of potential energy or by means of the system according to the invention, comprising such a storage unit, it is possible in particular to ensure a continuous and uninterrupted feed-in and feed-out of energy to and from an power supply network in a structurally simple and cost-effective manner.

LIST OF REFERENCE SIGNS

2 Storage unit
4 Potential energy storage device
6 Guide element
8 Guide path
10 Shaft
12 Insertion opening
14 Stock
16 Beginning
18 End
20 Switching element
22 Brake device
24 Frequency converter
26 Motor
27 Gearbox
28 Generator
30 Power supply network
32 Detection unit
34 Detection unit
36 Processing unit
38 Control unit
40 Line system
50 Detecting a current network load
52 Determining an energy to be extracted or discharged
54 Controlling an energy transfer

The invention claimed is:

1. A storage unit for storing energy in the form of potential energy, comprising:
at least one potential energy storage device for receiving, storing and delivering energy, and
at least one guide element for guiding the potential energy storage device along a guide path,
wherein the guide path is arranged within a shaft located in the ground vertically to the ground surface,
wherein the potential energy storage device gains the stored potential energy by conversion from kinetic energy and releases it by conversion to kinetic energy,
wherein the kinetic energy results from a movement of the potential energy storage device along the guide path, and
wherein
the potential energy storage device is formed in the form of a continuous weight extending over the length of the guide path, wherein a detection unit is provided for detecting the current storage capacity, wherein the detection unit has sensors which are designed in the form of a rotary encoder.

2. The storage unit according to claim 1, wherein the potential energy storage device is formed in the form of at least a rope or a chain.

3. The storage unit according to claim 1, characterized in that the potential energy storage device is formed in the form of a chain.

4. The storage unit according to claim 1, wherein the potential energy storage device is formed from a metal material.

5. The storage unit according to claim 1, wherein a stock is provided for storing the energy storage device.

6. The storage unit according to claim 5, wherein the stock is designed in the form of a trench let into the ground.

7. The storage unit according to claim 1, wherein the guide element is in the form of at least a chain wheel or a rope drum.

8. The storage unit according to claim 1, wherein the potential energy storage device has a beginning and an end.

9. The storage unit according to claim 1, wherein the potential energy storage device is arranged in an initial state within the shaft in such a way that movement of the energy storage device along the guide path in a direction opposite to the earth's surface takes place after release without auxiliary power.

10. The storage unit according to claim 1, wherein the guide element has a switching element for releasing the potential energy storage device.

11. The storage unit according to claim 1, wherein an emergency brake device is provided for braking and stopping the potential energy storage device in the event of a hazardous situation or a power failure.

12. The storage unit according to claim 1, wherein a plurality of potential energy storage devices are provided.

13. The storage unit according to claim 1, wherein a plurality of stocks are provided for storing the energy storage devices.

14. The storage unit according to claim 1, wherein a plurality of switching elements are provided.

15. A system for balancing network fluctuations of a power supply network, comprising:
a storage unit according to claim 1,
at least one motor for driving the guide element via energy from the power supply network,
at least one generator for converting kinetic energy of the potential energy storage device into electrical energy for delivery to the power supply network, and
a line system for exchanging electrical energy between the power supply network and the storage unit,
the system being designed in such a way that, in times of undersupply of the power supply network, potential energy can be converted into electrical energy by means of the storage unit and can be fed into the power supply network, and, in times of oversupply of the power supply network, electrical energy can be removed from the power supply network and converted into potential energy for storage.

16. The system according to claim 15, wherein a frequency converter is provided for converting the current into a form suitable for the motor.

17. The system according to claim 15, wherein the detection unit is configured to detect a current network load.

18. The system according to claim 15, wherein a processing unit is provided for determining an energy which can be withdrawn from the power supply network or is to be discharged into the power supply network on the basis of the detected current network utilization, and a control unit is provided for controlling an energy transfer between the storage unit and the power supply network on the basis of the determined energy which can be withdrawn from the power supply network or is to be discharged into the power supply network.

19. A method for balancing network fluctuations of a power supply network using a system according claim 15, comprising the steps:
detecting a current network load of a power supply network by means of the detection unit,
determining an energy to be extracted from or discharged into the power supply network based on the detected current network load by means of a processing unit, and
controlling an energy transfer between the storage unit and the power supply network on the basis of the determined energy to be extracted or discharged into the power supply network by means of a control unit,
wherein in times of an undersupply of a power supply network potential energy is converted into electrical energy by means of the storage unit and fed into the power supply network and in times of an oversupply of the power supply network electrical energy is withdrawn from the power supply network and converted into potential energy for storage.

* * * * *